(12) United States Patent
Fleming et al.

(10) Patent No.: US 10,081,314 B2
(45) Date of Patent: *Sep. 25, 2018

(54) RETROREFLECTIVE ARTICLES HAVING A MACHINE-READABLE CODE

(71) Applicant: 3M INNOVATIVE PROPERTIES COMPANY, St. Paul, MN (US)

(72) Inventors: Patrick R. Fleming, Lake Elmo, MN (US); Thomas J. Dahlin, Ironwood, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,546

(22) Filed: Oct. 13, 2016

(65) Prior Publication Data

US 2017/0028940 A1 Feb. 2, 2017

Related U.S. Application Data

(63) Continuation of application No. 14/388,082, filed as application No. PCT/US2013/034605 on Mar. 29, 2013, now Pat. No. 9,471,863.
(Continued)

(51) Int. Cl.
| | |
|---|---|
| *G06K 7/10* | (2006.01) |
| *G06K 19/06* | (2006.01) |
| *B60R 13/10* | (2006.01) |
| *G06K 7/14* | (2006.01) |
| *G06K 9/32* | (2006.01) |
| *E01F 9/60* | (2016.01) |

(52) U.S. Cl.
CPC ............ *B60R 13/10* (2013.01); *E01F 9/60* (2016.02); *G06K 7/14* (2013.01); *G06K 9/325* (2013.01); *G06K 19/0614* (2013.01); *G06K 19/06103* (2013.01)

(58) Field of Classification Search
USPC .......... 235/375, 454–457, 462.42, 491, 494, 235/462.01
See application file for complete search history.

(56) References Cited

U.S. PATENT DOCUMENTS

| 1,591,572 A | 7/1926 | Stimson |
| 3,190,178 A | 6/1965 | McKenzie |

(Continued)

FOREIGN PATENT DOCUMENTS

| EP | 0416742 | 3/1991 |
| JP | H6-234287 | 8/1994 |
| WO | 2011-044149 | 4/2011 |

OTHER PUBLICATIONS

International Search Report for PCT International Application No. PCT/US2013/034605 dated Jul. 10, 2013, 4 pages.

*Primary Examiner* — Tuyen K Vo

(57) ABSTRACT

Retroreflective articles comprise a substrate and a bar code provided on the substrate. The bar code comprises at least one human-readable information which provides framing information and a machine-readable information which provides variable information. The human-readable information is visible under a first condition and invisible under a second condition, and the machine-readable information is invisible under the first condition and visible under the second condition.

11 Claims, 5 Drawing Sheets

Related U.S. Application Data

(60) Provisional application No. 61/618,469, filed on Mar. 30, 2012.

(56) References Cited

U.S. PATENT DOCUMENTS

| | | | |
|---|---|---|---|
| 4,025,159 A | 5/1977 | McGrath | |
| 4,368,979 A | 1/1983 | Ruell | |
| 4,491,923 A | 1/1985 | Look | |
| 4,588,258 A | 5/1986 | Hoopman | |
| 4,775,219 A | 10/1988 | Appeldorn | |
| 4,889,367 A | 12/1989 | Miller | |
| 5,066,098 A | 11/1991 | Kult | |
| 5,138,488 A | 8/1992 | Szczech | |
| 5,304,789 A | 4/1994 | Lob et al. | |
| 5,450,235 A | 9/1995 | Smith | |
| 5,508,105 A | 4/1996 | Orensteen et al. | |
| 5,557,836 A | 9/1996 | Smith | |
| 5,680,463 A * | 10/1997 | Windel | G07B 17/00193 380/51 |
| 5,788,796 A | 8/1998 | Look | |
| 6,024,455 A | 2/2000 | O'Neill et al. | |
| 6,120,636 A | 9/2000 | Nilsen | |
| 6,157,486 A | 12/2000 | Benson, Jr. et al. | |
| 6,832,728 B2 | 12/2004 | Kennedy | |
| 6,906,480 B2 | 6/2005 | Minks | |
| 6,926,746 B2 | 8/2005 | Stumpf | |
| 7,387,393 B2 | 6/2008 | Reich et al. | |
| 7,770,799 B2 | 8/2010 | Wang | |
| 2002/0030112 A1 | 3/2002 | Schreiber | |
| 2004/0060990 A1 | 4/2004 | Hilton et al. | |
| 2004/0089727 A1 * | 5/2004 | Baharav | G06K 1/121 235/494 |
| 2004/0091658 A1 | 5/2004 | Ginkel | |
| 2005/0259033 A1 * | 11/2005 | Levine | B60K 26/00 345/7 |
| 2007/0126226 A1 | 6/2007 | Kolodzie | |
| 2007/0139775 A1 | 6/2007 | Reich | |
| 2009/0032601 A1 * | 2/2009 | Leanza | G06Q 50/18 235/487 |
| 2010/0092747 A1 | 4/2010 | Chung et al. | |
| 2010/0151213 A1 | 6/2010 | Smithson | |
| 2010/0327051 A1 | 12/2010 | Lyon et al. | |
| 2012/0181340 A1 * | 7/2012 | Hsu | B60R 13/10 235/492 |

* cited by examiner

RETROREFLECTIVE ARTICLES HAVING A MACHINE-READABLE CODE

CROSS REFERENCE TO RELATED APPLICATIONS

This application is a continuation of U.S. patent application Ser. No. 14/388,082, filed Sep. 25, 2014, now U.S. Pat. No. 9,471,863, which is a national stage filing under 35 U.S.C. 371 of PCT/US2013/034605, filed Mar. 29, 2013, which claims priority to U.S. Provisional Patent Application No. 61/618,469, filed Mar. 30, 2012, the disclosures of which are incorporated by reference in their entirety herein.

TECHNICAL FIELD

The present application relates generally to retroreflective articles having a machine-readable code that are useful, for example, in machine vision systems.

BACKGROUND

Optimally, license plates have an overall similarity of styling or appearance that enables rapid recognition of license plates issued by various licensing authorities and that inhibits counterfeiting. At the same time, license plates should provide a distinct, individualized and unique identifying code or image for each vehicle, state, or driver. To that end, many licensing authorities offer "vanity" license plates. Such plates allow the driver to select an attractive or meaningful design or message that will be printed on their license plate. The production of such "vanity" license plates results in each state offering numerous different license plate designs to its constituents.

Meanwhile, automated enforcement systems, including, for example, electronic toll systems, red light running systems, speed enforcement systems, and access control systems, are becoming more prevalent. Many embodiments of such systems rely on an accurate reading of a vehicle's license plate, which is often performed by an automated license plate recognition (ALPR) system. However, obtaining an accurate reading of a vehicle's license plate is becoming increasingly difficult due to the wide variety of license plates now on the roads.

Automatic Vehicle Identification (AVI) is a term applied to the detection and recognition of a vehicle by an electronic system. Exemplary uses for AVI include, for example, automatic tolling, traffic law enforcement, searching for vehicles associated with crimes, and facility access control. Ideal AVI systems are universal (i.e., they are able to uniquely identify all vehicles with 100% accuracy). The two main types of AVI systems in use today are (1) systems using RFID technology to read an RFID tag attached to a vehicle and (2) systems using a camera or optical device and a computer to read a machine-readable code attached to a vehicle.

One advantage of RFID systems is their high accuracy, which is achieved by virtue of error detection and correction information contained on the RFID tag. Using well known mathematical techniques (cyclic redundancy check, or CRC, for example), the probability that a read is accurate (or the inverse) can be determined. However, RFID systems have some disadvantages, including that not all vehicles include RFID tags. Also, existing unpowered "passive" RFID tag readers may have difficulty pinpointing the exact location of an object. Rather, they simply report the presence or absence of a tag in their field of sensitivity. Moreover, many RFID tag readers only operate at short range, function poorly in the presence of metal, and are blocked by interference when many tagged objects are present. Some of these problems can be overcome by using active RFID technology or similar methods. However, these techniques require expensive, power-consuming electronics and batteries, and they still may not determine position accurately when attached to dense or metallic objects.

Machine vision systems (often called Automated License Plate Readers or ALPR systems) use a machine or device to read a machine-readable code attached to a vehicle. In many embodiments, the machine-readable code is attached to, printed on, or adjacent to a license plate. One advantage of ALPR systems is that they are can be used almost universally, since almost all areas of the world require that vehicles have license plates with visually identifiable information thereon. However, the task of recognizing visual tags can be complicated. For example, the read accuracy from an ALPR system is largely dependent on the quality of the captured image as assessed by the reader. Existing systems have difficulty distinguishing tags from complex backgrounds and handling variable lighting. Further, the accuracy of ALPR systems suffers when license plates are obscured or dirty.

Some exemplary ALPR systems include a bar code (or other machine-readable portion) containing an identification code which will provide information about the vehicle. Typically, the bar code on a license plate includes inventory control information (i.e., a small bar code not intended to be read by the ALPR). Some publications (e.g., European Patent Publication No. 0416742 and U.S. Pat. No. 6,832,728) discuss including one or more of owner information, serial numbers, vehicle type, vehicle weight, plate number, state, plate type, and county on a machine-readable portion of a license plate.

SUMMARY

In one aspect, the inventors of the present application sought to develop a bar code wherein framing and variable information are obtained under two different conditions. In some embodiments, the framing information is provided by human-readable information, and variable information is provided by machine-readable information.

In another aspect, the inventors of the present application sought to make automated license plate identification easier while maintaining the aesthetics of the license plate design. License plates can be challenging for an automated license plate recognition system to read due to at least some of the following factors: (1) varying reflective properties of the license plate materials; (2) non-standard fonts, characters, and designs on the license plates; (3) varying embedded security technologies in the license plates; (4) variations in the cameras or optical character recognition systems; (5) the speed of the vehicle passing the camera or optical character recognition system; (6) the volume of vehicles flowing past the cameras or optical character recognition systems; (7) the spacing of vehicles flowing past the cameras or optical character recognition systems; (8) wide variances in ambient illumination surrounding the license plates; (9) weather; (10) license plate mounting location and/or tilt; (11) wide variances in license plate graphics; (12) the detector-to-license plate-distance permissible for each automated enforcement system; and (13) occlusion of the license plate by, for example, other vehicles, dirt on the license plate, articles on the roadway, natural barriers, etc. The inventors of the present application sought to improve the accuracy of automated license plate identification without significantly changing the appearance of the license plate under a first condition. In some embodiments, a license plate comprising an identification system (i.e., a machine-readable bar code) which is invisible to a viewer under a first condition, such as, for example, ambient visible condition, is provided.

One embodiment of the present application relates to a retroreflective article comprising a retroreflective substrate having at least one human-readable information and an embedded machine-readable information, wherein the embedded machine-readable information is contained within the boundaries of at least a portion of the human-readable information.

Another embodiment of the present application relates to an article comprising a substrate and a bar code provided on the substrate, the bar code comprising at least one human-readable information which provides framing information and a machine-readable information which provides variable information; wherein the human-readable information is visible under a first condition and invisible under a second condition and the machine-readable information is invisible under the first condition and visible under the second condition.

Yet another embodiment of the present application relates to a bar code comprising framing information and variable information, wherein the framing information is visible under a first condition and invisible under a second condition, and the variable information is invisible under the first condition and visible under the second condition.

As used herein, the term "machine-readable information" refers to information that is encoded in a form that can be optically imaged by a machine or computer and interpreted by its hardware and software.

As used herein, the term "human-readable information" refers to information that can be read and comprehended by a human.

As used herein, the term "contained" means that the spatial features of embedded machine-readable information overlap with and are located within the spatial limits of at least a portion of human-readable information.

As used herein the terms "invisible" and "not visible" mean not easily detectable and/or not visually noticeable by an optical detector. In contrast, the term "visible", as used herein, means easily detectable and/or visually noticeable by an optical detector.

As used herein, a "machine-readable bar code" requires framing information and variable information. In some embodiments of the present application, a machine-readable bar code is provided wherein framing information is provided by human-readable information and variable information is provided by machine-readable information.

As used herein, "optically inactive" means not retroreflective.

DETAILED DESCRIPTION

Figure 1:
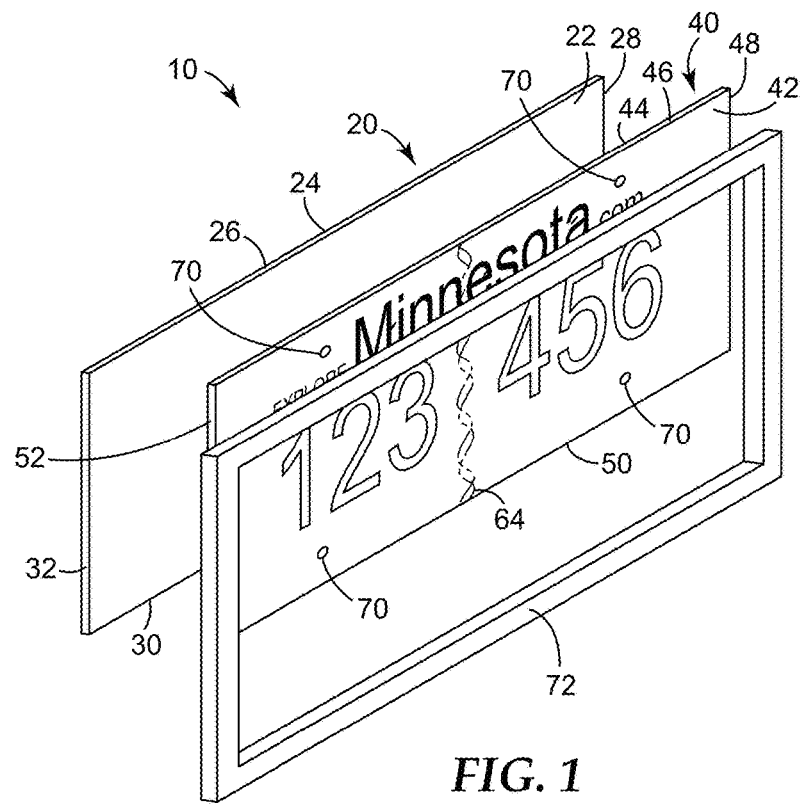
FIG. 1 is an exploded view of an exemplary motor vehicle license plate.

Various embodiments and implementations will be described in detail. These embodiments should not be construed as limiting the scope of the present application in any manner, and changes and modifications may be made without departing from the spirit and scope of the inventions. For example, many of the embodiments, implementations, and examples are discussed with specific reference to license plates, but these should not be construed to limit the application scope to this one exemplary implementation. Further, only some end uses have been discussed herein, but end uses not specifically described herein are included within the scope of the present application. As such, the scope of the present application should be determined by the claims.

In a first embodiment, the present application relates to a retroreflective article comprising: a retroreflective substrate having at least one human-readable information and an embedded machine-readable information, wherein the embedded machine-readable information is contained within the boundaries of at least a portion of the human-readable information.

In a second embodiment, the present application relates to the retroreflective article of the first embodiment, wherein the human-readable information is visible under a first condition and invisible under a second condition, and the embedded machine-readable information is invisible under the first condition and visible under the second condition.

In a third embodiment, the present application relates to the retroreflective article of the second embodiment, wherein the first condition is a first spectral range or first lighting condition, and the second condition is a second spectral range or a second lighting condition.

In a fourth embodiment, the present application relates the retroreflective article the third embodiment, wherein the first spectral range is between about 400 nm and about 700 nm and the second spectral range is between about 700 nm and about 1100 nm.

In a fifth embodiment, the present application relates to the retroreflective article of the third embodiment, wherein the first lighting condition is ambient visible condition and the second lighting condition is visible retroreflective condition.

In a sixth embodiment, the present application relates to a retroreflective article as in any one of the preceding embodiments, wherein the at least one human-readable information and the embedded machine-readable information form a bar code.

In a seventh embodiment, the present application relates to the retroreflective article of the sixth embodiment, wherein the human-readable information provides framing information and the embedded machine-readable information provides variable information.

In an eighth embodiment, the present application relates to a retroreflective article as in any one of the preceding embodiments, wherein the retroreflective substrate includes prismatic sheeting or beaded sheeting.

In a ninth embodiment, the present application relates a retroreflective article as in any one of the preceding embodiments, wherein the human-readable information comprises at least a portion of at least one alphanumeric character or a geometric shape.

In a tenth embodiment, the present application relates to a retroreflective article as in any one of the preceding embodiments, wherein the article is a license plate.

In an eleventh embodiment, the present application relates to an article comprising a substrate and a bar code provided on the substrate, the bar code comprising at least one human-readable information which provides framing information and a machine-readable information which provides variable information; wherein the human-readable information is visible under a first condition and invisible under a second condition, and the machine-readable information is invisible under the first condition and visible under the second condition.

In a twelfth embodiment, the present application relates the article of the eleventh embodiment, wherein the substrate is retroreflective.

In a thirteenth embodiment, the present application relates to an article as in one of embodiments 11 and 12, wherein the first condition is a first spectral range or a first lighting condition, and the second condition is a second spectral range or a second lighting condition.

In a fourteenth embodiment, the present application relates to the article of the thirteenth embodiment, wherein the first spectral range is between about 400 nm and about 700 nm and the second spectral range is between about 700 nm and about 1100 nm.

In a fifteenth embodiment, the present application relates to the article of the thirteenth embodiment, wherein the first lighting condition is ambient visible condition and the second lighting condition is visible retroreflective condition.

In a sixteenth embodiment, the present application relates to an article as in one of embodiments 11-15, wherein the human-readable information comprises at least a portion of at least one alphanumeric character.

In a seventeenth embodiment, the present application relates to an article as in one of embodiments 11-16, wherein the machine-readable information is contained within the boundaries of at least a portion of the human-readable information.

In an eighteenth embodiment, the present application relates to an article as in one of embodiments 11-17, wherein the substrate is retroreflective.

In a nineteenth embodiment, the present application relates to the article of embodiment 18, wherein the retroreflective substrate includes prismatic sheeting or beaded sheeting.

In a twentieth embodiment, the present application relates to an article as in one of embodiments 11-19, wherein the article is a license plate.

In a twenty-first embodiment, the present application relates to a bar code comprising framing information and variable information, wherein the framing information is visible under a first condition and invisible under a second condition, and the variable information is invisible under the first condition and visible under the second condition.

In a twenty-second embodiment, the present application relates the bar code of embodiment 21, wherein the first condition is a first spectral range or first lighting condition, and the second condition is a second spectral range or a second lighting condition.

In a twenty-third embodiment, the present application relates the bar code of embodiment 22, wherein the first spectral range is between about 400 nm and about 700 nm and the second spectral range is between about 700 nm and about 1100 nm.

In a twenty-fourth embodiment, the present application relates the bar code of embodiment 22, wherein the first lighting condition is ambient visible condition and the second lighting condition is visible retroreflective condition.

In a twenty-fifth embodiment, the present application relates an article comprising a bar code as in one of embodiments 21-24.

In a twenty-sixth embodiment, the present application relates to the article of embodiment 25, wherein the article is a license plate.

In a twenty-seventh embodiment, the present application relates to automated license plate reader systems comprising the article of embodiment 10, 20 or 26 and a detector.

In a twenty-eighth embodiment, the present application relates to the system of embodiment 27, wherein the detector comprises a camera and a lighting system.

In at least some preferred embodiments, the retroreflective article (e.g., license plate) has both human-readable information and machine-readable information. Examples of human-readable information include, but are not limited to, alphanumeric characters, designs, geometric shapes, symbols, and Asian language characters. As used herein, the term "machine-readable information" refers to information that is encoded in a form that can be optically imaged by a machine or computer and interpreted by its hardware and software, but not by a human. Theoretically, anything that can be read by a human can also be read by a machine, although it may not necessarily be comprehended by a human. As used herein, the term "human-readable information" refers to information that can be read and comprehended by a human. Exemplary types of machine-readable information include, for example, bar codes, color bar codes, 2D bar codes, geometric symbols as described in European Publication No. 0416742 and the like. The machine-readable information can be, for example, visible or invisible to a detector (e.g., human eye, camera).

Machine-readable bar codes require framing information and variable information. Framing information in a bar code is used to allow location of the variable information within the bar code. Examples of framing information include 8 bit by 8 bit squares in each of three corners of QR (QUICK RESPONSE) bar codes. Data Matrix 2D bar codes use a dark bar along two edges and alternating dark and light bits along the other two edges as framing information. In the existing bar codes, framing information is provided adjacent the variable information, and is obtained from the same image (e.g., taken under the same condition) from which the variable information (e.g., data) is obtained.

In some embodiments, variable information is in the form of a binary optical code. In binary optical codes all areas of the code are divided into a set number and geometry of known regions. All regions in an image are then classified as either light or dark. Light regions or pixels represent a value (e.g., 0 (zero)) and dark regions represent another value (e.g., 1). Large contrast (i.e., difference in brightness)

between light and dark regions allow for easier interpretation of the binary optical code.

In one aspect of the present application, the inventors sought to develop a bar code in which at least a portion of the framing information is obtained from an image taken under a different condition than the condition used to obtain the variable information. In some embodiments, resolution of the images used to obtain framing and variable information are not substantially different. As used herein, "resolution of the images" means that each pixel covers substantially the same amount of area of an object. In some embodiments, the resolution of the images is within a factor of about 1, 2, 5, or 10. In some embodiments, framing information is obtained from an image taken under a first spectral range, and the variable information is obtained from an image taken under a second spectral range, different from the first spectral range. In some preferred embodiments, framing information is visible under the first spectral range and invisible under the second spectral range, and the variable information is invisible under the first spectral range and visible under the second spectral range. As used herein the terms "invisible" and "not visible" mean not easily detectable and/or not visually noticeable by an optical detector. In contrast, the term "visible", as used herein, means easily detectable and/or visually noticeable by an optical detector.

In some embodiments, framing information is obtained from an image taken under a first lighting condition, and the variable information is obtained from an image taken under a second lighting condition, different from the first lighting condition. In some preferred embodiments, framing information is visible under the first lighting condition and invisible under the second lighting condition, and the variable information is invisible under the first lighting condition and visible under the second lighting condition.

In some preferred embodiments, the human-readable information and the machine-readable information form a bar code. In some preferred embodiments, the human-readable information provides framing information while the machine-readable information provides variable information. In the bar code of the present application, framing information (e.g., human-readable information) may occupy at least some of the same space as the variable information (e.g., machine-readable information) on a given article. The two images needed to obtain both framing and variable information are images of the same article obtained under different spectral ranges, lighting conditions and/or relative motion conditions. As a result, the machine-readable information is concealed by the human-readable information under a first condition. In some embodiments, the human-readable information is visible to an optical detector (e.g., human eye, camera) under a first spectral range and invisible to the detector under a second spectral range, whereas the embedded machine-readable information is visible to the detector under the second spectral range but invisible under the first spectral range. In some embodiments, the first spectral range is from about 400 nm to about 700 nm (i.e., visible light spectrum) and the second spectral range is from about 700 nm to about 1100 nm (i.e., near infrared spectrum). In some embodiments, the human-readable information is visible to the detector under a first lighting condition and invisible to the detector under a second lighting condition, whereas the embedded machine-readable information is visible to the detector under the second lighting condition but invisible under the first lighting condition. In some embodiments, the first lighting condition is an ambient visible condition (i.e., diffuse visible light) and the second lighting condition is a visible retroreflective condition (i.e., coaxial visible light). In some embodiments, the position of the light source(s) is different in the first and second lighting conditions.

In some embodiments of the present application, the machine-readable information is an embedded machine-readable information. The embedded machine-readable information is completely contained within the boundaries of at least a portion of the human-readable information, and completely concealed by the human-readable information. The term "contained" as used herein means that the spatial features of the embedded machine-readable information overlap with and are located within the spatial limits of at least a portion of the human-readable information.

In one aspect of the present application, the inventors sought to develop articles having the bar code described herein. Exemplary articles include retroreflective and optically inactive (i.e., non retroreflective) articles. Examples of retroreflective articles include, but are not limited to, license plates, signage, and validation stickers. Examples of optically inactive articles include, but are not limited to, graphic designs.

Figure 2:
FIG. 2 is digital photograph of the license plate of FIG. 1 under ambient visible conditions.

FIGS. 1 and 2 are, respectively, an exploded perspective view of an exemplary motor vehicle license plate and a digital photograph of the license plate as viewed under visible ambient conditions (i.e., under diffuse visible light conditions) by an optical detector such as, for example, a human or a digital camera. License plate 10 includes a rectangular license plate blank 20 positioned adjacent to a rectangular piece of retroreflective sheeting 40. License plate blank 20 includes two major surfaces 22 and 24 separated by a thickness that is bound by four side surfaces 26, 28, 30, and 32. License plate blank 20 may be formed of any material having the desired rigidity, for example, metal, plastic, or wood. Retroreflective sheeting 40 includes two major surfaces 42 and 44 separated by a thickness that is bound by four side surfaces 46, 48, 50, and 52. Printed on retroreflective sheeting 40 are: a Minnesota graphic 60; "Explore Minnesota.com" text 62; "JAN" text 63; "10,000 Lakes" text 64; the alphanumeric characters "001 SPL" 66; and a wooded lake background graphic 68. License plate 10 may optionally include four holes 70 cut through retroreflective sheeting 40 and license plate blank 20 that facilitate affixation of license plate 10 to a motor vehicle by, for example, screws or rivets. This is only one exemplary affixation system and those of skill in the art will appreciate that others can be used. License plate blank 20 and retroreflective sheeting may optionally be held together and centered in the middle of frame 72.

Figure 3:
FIG. 3 is a digital photograph of the license plate of FIG. 1 under visible retroreflective conditions.

FIG. 3 is a digital photograph of the license plate of FIGS. 1 and 2 shown as viewed under visible retroreflective conditions (i.e., coaxial visible light illumination). A bar code is provided on license plate 10, where the alphanumeric characters 66 provide the framing information and the embedded machine-readable information provides variable information 80. In FIGS. 2 and 3, variable information 80 is invisible to, for example, the human eye.

Figure 4:
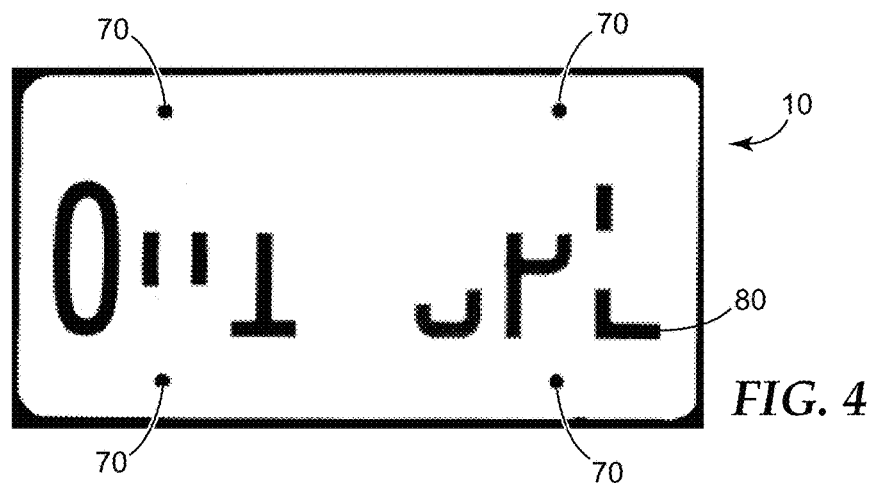
FIG. 4 is a digital photograph of the license plate of FIG. 1 under retroreflective infrared conditions.

FIG. 4 is a digital photograph of the license plate of FIGS. 1 and 2 shown as viewed under retroreflective infrared conditions (i.e., coaxial infrared illumination). In FIG. 4, variable information 80 is completely contained within the boundaries of the alphanumeric characters 66. Variable information 80 was provided by selectively adhering pieces of visible and infrared-scattering pressure sensitive adhesive tape "Scotch Magic Tape", commercially available from 3M Company, of St. Paul, Minn., over the alphanumeric characters 66. Variable information 80 overlaps alphanumeric characters 66. Under both ambient visible light conditions and visible retroreflective conditions, as shown, respectively, in FIGS. 2 and 3, variable information 80 is not visible, while alphanumeric characters 66 are visible. Therefore, framing information may be obtained from images taken either under ambient visible conditions or visible retroreflective conditions. Variable information 80 may be obtained from images taken under retroreflective infrared conditions, as shown in FIG. 4, since variable information 80 is visible under these conditions while alphanumeric characters 66 are not.

Figure 5:
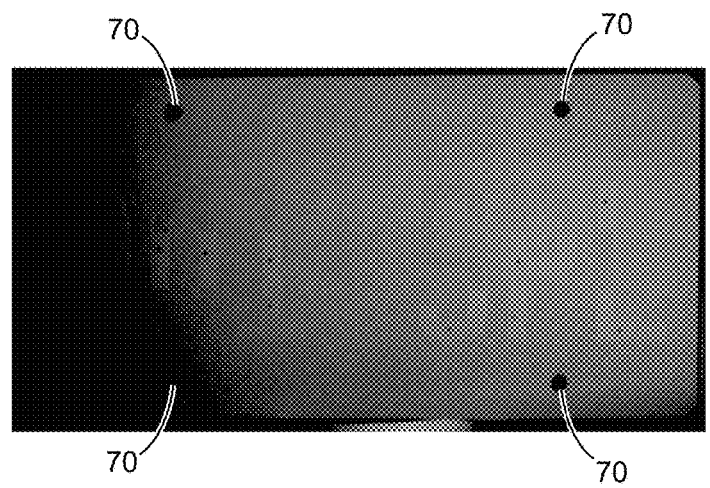
FIG. 5 is a digital photograph of the license plate of FIG. 1 under off-axis infrared illumination conditions.

FIG. 5 is a digital photograph of the license plate of FIGS. 1 and 2 shown as viewed under off-axis infrared illumination conditions (i.e., wherein infrared illumination is not coincident with the optical axis of the camera lens). Neither the alphanumeric characters 66 nor the variable information 80 is visible under these conditions.

Figure 6:
FIG. 6 is digital photograph of an exemplary license plate under ambient visible conditions.

FIG. 6 is a digital photograph of yet another exemplary license plate as viewed under visible ambient conditions by an optical detector. License plate 100 includes a rectangular license plate blank 120 positioned adjacent to a rectangular piece of retroreflective (e.g., retroreflective) sheeting 140. Retroreflective sheeting 140 includes two major surfaces 142 and 144 separated by a thickness that is bound by four side surfaces 146, 148, 150, and 152. Printed on retroreflective sheeting 140 are: a Minnesota graphic 160; "Explore Minnesota.com" text 162; "JAN" text 163; "10,000 Lakes" text 164; the alphanumeric characters "SAM 123" 166; and a wooded lake background graphic 168. License plate 100 may optionally include four holes 170 cut through retroreflective sheeting 140 and license plate blank 120 that facilitate affixation of license plate 100 to a motor vehicle by, for example, screws or rivets. A bar code is provided on license plate 100, wherein the alphanumeric characters 166 provide framing information and an embedded machine-readable information provides variable information 180. Variable information 180 is invisible under ambient visible conditions.

Figure 7:
FIG. 7 is a digital photograph of the license plate of FIG. 6 under visible retroreflective conditions.

FIG. 7 is a digital photograph of the license plate of FIG. 6 shown as viewed under visible retroreflective conditions. In FIGS. 6 and 7, variable information 180 is invisible by an optical detector.

Figure 8:
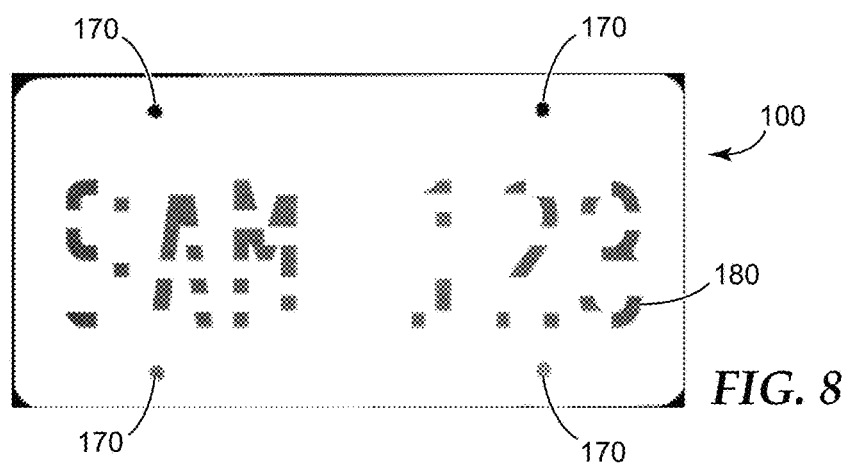
FIG. 8 is a digital photograph of the license plate of FIG. 6 under retroreflective infrared conditions.

FIG. 8 is a digital photograph of the license plate of FIGS. 6 and 7 shown as viewed under retroreflective infrared conditions. FIG. 8 shows the variable information 180, which is completely contained within the boundaries of the alphanumeric characters 166. The alphanumeric characters 166 were printed using infrared transparent CMY inks. Variable information 180 was provided by printing partial alphanumeric characters using a visibly opaque, infrared-absorbing black ink. Variable information 180 overlaps alphanumeric characters 166. Under both ambient visible light conditions and visible retroreflective conditions, as shown, respectively, in FIGS. 6 and 7, variable information 180 is not visible, while alphanumeric characters 166 are visible. Under retroreflective infrared conditions, as shown in FIG. 7, variable information 180 is visible while alphanumeric characters 166 are not visible.

Figure 9:
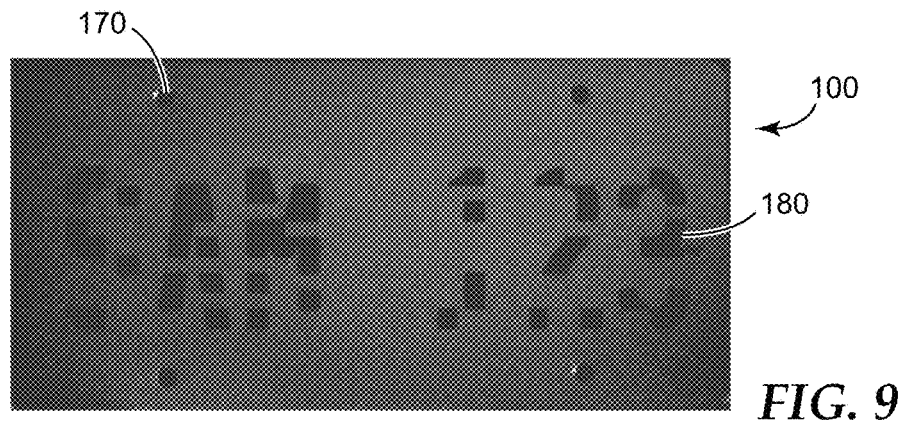
FIG. 9 is a digital photograph of the license plate of FIG. 6 under off-axis infrared illumination conditions.

FIG. 9 is a digital photograph of the license plate of FIG. 6 shown as viewed under off-axis infrared illumination conditions. Under these conditions variable information 180 is visible while alphanumeric characters 166 are not. Framing information of the bar code provided on license plate 100 may be obtained from images taken under ambient visible conditions or under visible retroreflective conditions. Variable information may be obtained from images taken under infrared retroreflective conditions or off-axis infrared illumination conditions.

Figure 10:
FIG. 10 is a digital photograph of an exemplary optically inactive article under visible ambient conditions.
Figure 11:
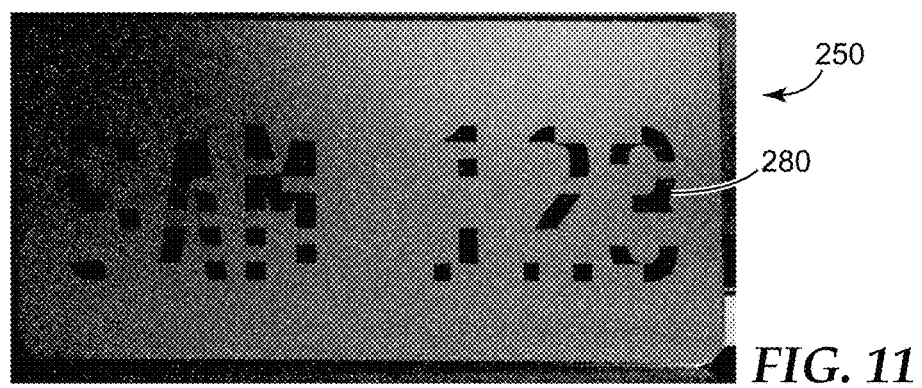
FIG. 11 is a digital photograph of the optically inactive article of FIG. 10 under off-axis infrared illumination conditions.

FIG. 10 is a digital photograph of an optically inactive article 200 shown as viewed under visible ambient conditions. Machine-readable information 280 is invisible in under this condition and concealed by alphanumeric characters "SAM 123" 266. FIG. 11 is a digital photograph shown as viewed under off-axis infrared illumination. Only the machine-readable information 280 is visible under this condition.

Figure 12:
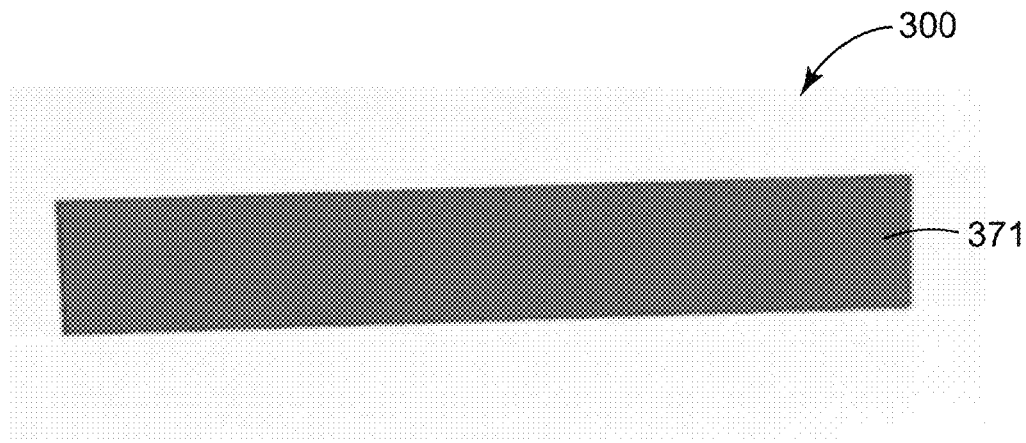
FIG. 12 is a digital photograph of an exemplary retroreflective article under visible ambient conditions.
Figure 13:
FIG. 13 is a digital photograph of the retroreflective article of FIG. 12 under visible retroreflective conditions.

In some embodiments, the human-readable information is a design or geometric shape which has no encoded information, such as, for example, a star, a rectangle, a circle, and a square. FIG. 12 is a digital photograph of a retroreflective article 300 shown as viewed under visible ambient conditions. Machine-readable information 380 is invisible under this condition, and concealed by human-readable information which, in this embodiment, is a red rectangle 371. FIG. 13 is a digital photograph shown as viewed under visible retroreflective conditions in which the background is saturated. Machine-readable information 380 is visible under this condition, while human-readable rectangle 371 is not.

The retroreflective article chosen for any specific implementation will depend on the desired optical, structural, and durability characteristics. As such, desirable retroreflective articles and materials will vary based on the intended application. Retroreflective articles and materials include reflective and retroreflective substrates. The term "retroreflective" as used herein refers to the attribute of reflecting an obliquely incident light ray in a direction antiparallel to its incident direction, or nearly so, such that it returns to the light source or the immediate vicinity thereof. Two known types of retroreflective sheeting are microsphere-based sheeting and cube corner sheeting (often referred to as prismatic sheeting). Microsphere-based sheeting, often referred to as "beaded" sheeting, employs a multitude of microspheres typically at least partially embedded in a binder layer and having associated specular or diffuse reflecting materials (e.g., pigment particles, metal flakes, vapor coats) to retroreflect incident light. Illustrative examples are described in, for example, U.S. Pat. No. 3,190,178 (McKenzie), U.S. Pat. No. 4,025,159 (McGrath), and U.S. Pat. No. 5,066,098 (Kult). Cube corner retroreflective sheeting, often referred to as "prismatic" sheeting, comprises a body portion typically having a substantially planar front surface and a structured rear surface comprising a plurality of cube corner elements. Each cube corner element comprises three approximately mutually perpendicular optical faces. Illustrative examples are described in, for example, U.S. Pat. No. 1,591,572 (Stimson), U.S. Pat. No. 4,588,258 (Hoopman), U.S. Pat. No. 4,775,219 (Appledorn et al.), U.S. Pat. No. 5,138,488 (Szczech), and U.S. Pat. No. 5,557,836 (Smith et al.). A seal layer may be applied to the structured surface to keep contaminants away from individual cube corners. Flexible cube corner sheetings, such as those described, for example, in U.S. Pat. No. 5,450,235 (Smith et al.) can also be incorporated in embodiments or implementations of the present application. Retroreflective sheeting for use in connection with the present application can be, for example, either matte or glossy.

The retroreflective articles described herein are ordinarily configured to include sheeting that can be applied to a given object or substrate. The articles are generally optically single-sided. That is, one side (designated the front side) is generally adapted to both receive incident light from a source and emit reflected or retroreflected light toward a detector (such as the eye of an observer), and the other side (designated the rear side) is generally adapted for application to an object such as by an adhesive layer. The front side faces the light source as well as the detector. The articles do not generally transmit significant amounts of light from the front side to the rear side, or vice versa, due at least in part to the presence of a substance or layer on the retroreflector such as a vapor coat of metal, a seal film, and/or an adhesion layer.

One use for the retroreflective articles described herein is in license plates that are detected by a license plate detection or recognition system. One exemplary license plate detection system uses a camera and a lighting system to capture license plate images. An image of the scene including the license plate can be made from, for example, ambient visible conditions and from light added by a designated light source (for example, coaxial lighting that directs light rays onto the license plate when the camera is preparing to record an image). The light rays emitted by the coaxial lighting in combination with the retroreflective properties of the license plate create a strong, bright signal from the location of the plate in the otherwise large image scene. The bright signal is used to identify the location of the license plate. Then, the automatic license plate recognition (ALPR) focuses on the region of interest (the region of brightness) and searches for matches to expected human-readable information or embedded machine-readable information by looking for recognizable patterns of contrast. In some embodiments, the recognized human-readable information provides framing information for a bar code, while the embedded machine-readable information provides variable information. Human-readable information is obtained under a first spectral range, and embedded machine-readable information is obtained under a second spectral range, different from the first spectral range.

The light in the driving and ALPR environment can be divided into the following spectral regions: visible light in the region between about 400 and about 700 nm and infrared light in the region between about 700 and about 1100 nm. Typical cameras have sensitivity that includes both of these ranges, although the sensitivity of a standard camera system decreases significantly for wavelengths longer than 1100 nm. Various light emitting diodes (LEDs) can emit light over this entire wavelength range, and typically most LEDs are characterized by a central wavelength and a narrow distribution around that wavelength. For example, in a system including LEDs emitting light rays having a wavelength of 830 nm +/−20 nm, a suitably equipped camera could detect a license plate in the near infrared spectrum with light not visible to the driver of the vehicle. Thus the driver would not see the "strobe" light effect of the LEDs and would not be distracted by them.

The cameras and lights for these systems are typically mounted to view the license plates at some angle to the direction of vehicle motion. Exemplary mounting locations include positions above the traffic flow or from the side of the roadway. Images are typically collected at an angle of 20 degrees to 45 degrees from normal incidence (head-on) to the license plate.

A detector which is sensitive to infrared or ultraviolet light as appropriate would be used to detect retroreflected light outside of the visible spectrum. Exemplary cameras include those sold by Federal Signal Technologies of Irvine Calif., including but not limited to the P372.

The retroreflective articles described herein can be used to improve the capture efficiency of these license plate detection or recognition systems. ALPR capture can be described as the process of correctly locating and identifying license plate data, including, but not limited to, indicia, plate type, and plate origin. Applications for these automated systems include, but are not limited to, electronic toll systems, red light running systems, speed enforcement systems, vehicle tracking systems, trip timing systems, automated identification and alerting systems, and vehicle access control systems. As is mentioned above, current automatic license plate recognition systems have capture efficiencies that are lower than desired due to, for example, low or inconsistent contrast of indicia as well as obscuring or distracting contrast of artwork and/or indicia on the license plate.

The retroreflective articles of the present application may also be used in signage. The term "signage" as used herein refers to an article that conveys information, usually by means of alphanumeric characters, symbols, graphics, or other indicia. Specific signage examples include, but are not limited to, signage used for traffic control purposes, street signs, identification materials (e.g., licenses), and vehicle license plates. It would advantageous in some applications to use the articles of the present application to employ the desirable property of viewing machine-readable bar codes without changing the appearance of a signage under visible light. Such retroreflective articles would enable the reading of signage specific information meant for general consumption while avoiding driver or sign reader distraction by and/or unwanted detection of "covert" markings, such as variable information of a bar code.

Such a development facilitates invisible marking of and/or signaling by articles for security purposes, identification, and inventory control. For example, the covert markings could contain signage-specific information such as, for example, signage material lot number, installation date, reorder information, or product life expectancy.

Objects and advantages of the present application are further illustrated by the following examples, but the particular materials and amounts thereof recited in the examples, as well as other conditions and details, should not be construed to unduly limit the invention, as those of skill in the art will recognize that other parameters, materials, and equipment may be used.

EXAMPLE 1

The retroreflective article shown in FIGS. 1-5 was prepared: a roll of white reflective sheeting (i.e., retroreflective substrate) 40 with pressure sensitive adhesive coated on the backside (commercially available under the designation "Preclear Reflective License Plate Sheeting Series 4790" from 3M Company, St. Paul, Minn.) was provided. Alphanumeric characters 66 and background graphic 68 were printed on the frontside of a 15 cm by 31 cm sample of the reflective sheeting using an UV inkjet printer (model "JF-1631", commercially available from Mimaki USA, Suwanee, Ga.) and visibly-opaque, infrared-transparent, cyan, magenta and yellow (CMY) inks (commercially available under the trade designation "Mimaki UV Piezo Inkjet Ink Series F-200" from 3M Company). The background graphic 68 was a wooded lake scene with the words "Explore Minnesota.com" 62 printed in blue across the upper portion of the retroreflective sheeting, and the words "JAN" 63 and "10,000 Lakes" 64 printed in blue across the lower portion of the retroreflective sheeting. Alphanumeric characters "001 SPL" 66 were printed in black, using a combination of cyan, magenta and yellow inks, on the approximate center of the sheeting. The printed sheeting was adhered to an aluminum substrate 20. The frontside of the sheeting was then laminated with "Clear Protective Film 9097" film commercialized by 3M Company. Embedded machine-readable information 80 (e.g., partial characters) was prepared by selectively adhering pieces of visible and infrared-scattering, pressure-sensitive adhesive tape "Scotch Magic Tape" (commercially available from 3M Company) over and selectively covering portions of the "001 SPL" characters 66.

FIG. 2 is a digital photograph of the retroreflective article 10 of Example 1 taken with a digital camera (model "PowerShot G12", commercially available from Canon U.S.A., Lake Success, N.Y.) under ambient conditions (e.g., diffuse light). In this condition, the embedded machine-readable information 80 was invisible to the viewer and/or camera. FIG. 3 is a digital photograph of the retroreflective article 10 of Example 1 taken with the "PowerShot G12" camera under visible retroreflective conditions, using the built-in flash. Under visible retroreflective conditions, the embedded machine-readable information 80 was concealed by the alphanumeric characters 66. FIG. 4 is a digital photograph of the retroreflective article 10 of Example 1 taken with a CCD (charge-coupled device) camera (model "Lu165", commercially available from Lumenera Corporation, Ottawa, Ontario) equipped with a 50 mm focal length lens (model "C-56-531" commercially available from Edmund Optics, Barrington, N.J.), and a filter that blocks visible light and allows near infrared light to pass through (model "R-72" commercially available from Edmund Optics) under retroreflective infrared conditions (i.e., wherein infrared illumination is nearly coincident with the optical axis of the camera lens). Infrared illumination was provided by an array of 48 diodes surrounding the camera lens emitting at a nominal wavelength of 810 nm. Because the inks used to print the alphanumeric characters "001 SPL" 66 were infrared-transparent, only portions of the alphanumeric characters covered by the infrared-scattering "Scotch Magic Tape" were visible under retroreflective infrared conditions. FIG. 5 is a digital photograph of the retroreflective article 10 of Example 1 taken with the "Lu165" camera under off-axis infrared illumination conditions, where infrared illumination was not coincident with the optical axis of the camera lens. Under off-axis infrared conditions, neither the alphanumeric characters nor the embedded machine-readable information was visible.

Framing information in Example 1 was provided by the alphanumeric characters 66 and obtained from FIG. 2. Alternatively, framing information could have been obtained from FIG. 3. Embedded machine-readable information 80 was obtained from FIG. 4. The alphanumeric characters "001 SPL" 66 contained 6 characters with three bits in each character, for a total of 18 bits. Under infrared conditions, a binary optical code was observed, wherein dark bits (e.g., infrared-opaque and/or scattering) represented a "1" and light (e.g., infrared-transparent) bits represented a "0". Variable information for Example 1, when the bits were read top to bottom and left to right, was: 1 1 1 0 1 0 0 11 0 0 1 0 1 1 1 0 1.

EXAMPLE 2

The retroreflective article 100 shown in FIGS. 6-9 was prepared: a printed retroreflective sheeting was prepared as described in Example 1, except that (1) the alphanumeric characters "SAM 123" 166 were printed using the CMY inks; and (2) embedded machine-readable information 180 was prepared by printing partial alphanumeric characters using a visibly opaque, infrared-absorbing (e.g., infrared opaque), black ink (commercially available under the trade designation "Mimaki UV Piezo Inkjet Ink Series F-200" from 3M Company). "Clear Protective Film 9097" film was laminated over the printed sheeting to provide a retroreflective article 100 with embedded machine-readable information 180 therein. The partial alphanumeric characters of the embedded machine-readable information overlapped perfectly with portions of the "SAM 123" characters 166.

FIG. 6 is a digital photograph of the retroreflective article 100 of Example 2 taken with the "PowerShot G12" camera under ambient conditions. Under ambient conditions, the embedded machine-readable information 180 was invisible to the viewer. FIG. 7 is a digital photograph of the retroreflective article 100 of Example 2 taken with the "PowerShot G12" camera under visible retroreflective conditions using the built-in flash. In this condition, the embedded machine-readable information 180 was concealed by the alphanumeric characters "SAM 123" 166 and invisible to the detector. FIG. 8 is a digital photograph of the retroreflective article 100 of Example 2 taken with the "Lu165" camera under retroreflective infrared conditions. Similarly to FIG. 4, only the embedded machine-readable information 180 was visible under retroreflective infrared conditions. FIG. 9 is a digital photograph of the retroreflective article 100 of Example 2 taken with the "Lu165" camera under off-axis infrared illumination conditions. Under off-axis infrared conditions, only the embedded machine-readable information 180 was visible.

Framing information in Example 2 was provided by the alphanumeric characters 166 and obtained from FIG. 6. Alternatively, framing information could have been obtained from FIG. 7. Embedded machine-readable information 180 was obtained from FIG. 8. Alternatively, embedded machine-readable information 180 could have been obtained from FIG. 9. The alphanumeric characters "SAM 123" contained 6 characters each character having a different number of bits, as shown in Table 1, below, for a total of 91 bits. Under infrared conditions, the embedded machine-readable information comprised a binary optical code, having dark bits, which represented a "1", and light bits, which represented a "0". Variable information for Example 2, when the bits were read from left to right tracing the characters, was: 10110110100010011011110110101011010110111100 110110101010001101001011011001001101110111 001101

TABLE 1

| Character | Number of Bits | Variable information visible under infrared conditions |
|---|---|---|
| "S" | 14 | 10110110100010 |
| "A" | 17 | 01101111011010101 |
| "M" | 21 | 101011011110011011010 |
| "1" | 12 | 101000110100 |
| "2" | 13 | 1011011001001 |
| "3" | 14 | 10110111001101 |

EXAMPLE 3

A printed article 200 having alphanumeric characters 266 and machine-readable information 280 was provided as described in Example 2, except that (1) an optically inactive substrate (white vinyl sheeting (obtained under the trade designation "CONTROLTAC Graphic Film IJ180-10" available from 3M Company) was used, and (2) no clear film was laminated over the printed sheeting.

FIG. 10 is a digital photograph of optically inactive article 200 taken under ambient conditions using the "PowerShot G12" camera. Under ambient light conditions, machine-readable information 280 was concealed by the alphanumeric characters "SAM 123" 266. FIG. 11 is a digital photograph taken under off-axis infrared illumination with the "Lu165" camera. Only the machine-readable information 280 was visible under this condition.

EXAMPLE 4

A retroreflective article 300 was prepared as described in Example 1, except that (1) no alphanumeric characters were printed; (2) a 1 in (2.54 cm) tall and 6.5 in (16.5 cm) wide machine-readable information pattern 380 depicted on FIG. 13 was printed on the retroreflective sheeting using a thermal transfer printer (obtained under the trade designation "3M Digital License Plate Printer", from 3M Company) and a white ribbon (obtained under the trade designation "Thermal Transfer Ribbon TTR 1321", from 3M Company); and (3) a 1 in (2.54 cm) tall and 6.5 in (16.5 cm) wide human-readable red rectangle 371 was printed over the machine-readable information using red ink (obtained under the trade designation "3M Process Color Series 990", from 3M Company).

FIG. 12 is a digital photograph taken under visible ambient conditions using the "PowerShot G12" camera. Under this condition, machine-readable information 380 was concealed by the human-readable rectangle 371. FIG. 13 is a digital photograph taken with the same camera in a darkened room using the built-in flash and saturating the background, providing visible on-axis illumination. Under retroreflective visible conditions, machine-readable information 380 was visible and human-readable rectangle 371 was invisible.

Those having skill in the art will appreciate that many changes may be made to the details of the above-described embodiments and implementations without departing from the underlying principles thereof. The scope of the present application should, therefore, be determined only by the following claims.

What is claimed is:

1. A retroreflective article comprising:
a retroreflective substrate having at least one human-readable information and an embedded machine-readable information, wherein the embedded machine-readable information is contained within the boundaries of at least a portion of the human-readable information.

2. The retroreflective article of claim 1, wherein the human-readable information is visible under a first condition and invisible under a second condition, and the embedded machine-readable information is invisible under the first condition and visible under the second condition.

3. The retroreflective article of claim 2, wherein the first condition is a first spectral range or first lighting condition, and the second condition is a second spectral range or a second lighting condition.

4. The retroreflective article of claim 3, wherein the first spectral range is between about 400 nm and about 700 nm and the second spectral range is between about 700 nm and about 1100 nm.

5. The retroreflective article of claim 3, wherein the first lighting condition is ambient visible condition and the second lighting condition is visible retroreflective condition.

6. The retroreflective article of claim 1, wherein the at least one human-readable information and the embedded machine-readable information form a bar code.

7. The retroreflective article of claim 6, wherein the human-readable information provides framing information and the embedded machine-readable information provides variable information.

8. The retroreflective article of claim 1, wherein the retroreflective substrate includes prismatic sheeting or beaded sheeting.

9. The retroreflective article of claim 1, wherein the human-readable information comprises at least a portion of at least one alphanumeric character or a geometric shape.

10. The retroreflective article of claim 1, wherein the article is a license plate.

11. The retroreflective article of claim 1, wherein the article is one of a traffic sign or street sign.

* * * * *